United States Patent
Akahori

(10) Patent No.: US 11,580,642 B2
(45) Date of Patent: Feb. 14, 2023

(54) DISEASE REGION EXTRACTION APPARATUS, DISEASE REGION EXTRACTION METHOD, AND DISEASE REGION EXTRACTION PROGRAM

(71) Applicant: FUJIFILM Corporation, Tokyo (JP)

(72) Inventor: Sadato Akahori, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/578,416

(22) Filed: Sep. 23, 2019

(65) Prior Publication Data

US 2020/0104995 A1    Apr. 2, 2020

(30) Foreign Application Priority Data

Oct. 1, 2018    (JP) .............................. JP2018-186788

(51) Int. Cl.
*G06K 9/00*        (2022.01)
*G06T 7/00*        (2017.01)
(Continued)

(52) U.S. Cl.
CPC .............. *G06T 7/0014* (2013.01); *G06T 7/11* (2017.01); *G06T 7/30* (2017.01);
(Continued)

(58) Field of Classification Search
CPC . G06T 2207/10081; G06T 2207/10088; G06T 2207/20081; G06T 2207/30016; G06T 7/0014; G06T 7/11; G06T 7/30
(Continued)

(56) References Cited

U.S. PATENT DOCUMENTS 10,163,040 B2    12/2018   Poole et al.
10,223,794 B2    3/2019    Schadewaldt et al.
(Continued)

FOREIGN PATENT DOCUMENTS

JP        2010517030      5/2010
JP        2013165765      8/2013
(Continued)

OTHER PUBLICATIONS

Pedemonte, Stefano, et al. "Detection and delineation of acute cerebral infarct on DWI using weakly supervised machine learning." International Conference on Medical Image Computing and Computer-Assisted Intervention. Springer, Cham. (Year: 2018).*
(Continued)

*Primary Examiner* — Andrew M Moyer
(74) *Attorney, Agent, or Firm* — JCIPRNET

(57) ABSTRACT

Provided are a disease region extraction apparatus, a disease region extraction method, and a disease region extraction program that can extract an infarction region even in an image in which it is difficult to prepare a large amount of data indicating a correct infarction region.

A disease region extraction apparatus includes: an image acquisition unit that acquires a first image obtained by capturing an image of a subject that has developed a disease; an estimated image derivation unit that estimates a second image, whose type is different from the type of the first image, from the first image to derive an estimated image; and a disease region extraction unit that extracts a disease region from the estimated image.

14 Claims, 7 Drawing Sheets

(51) Int. Cl.
*G06T 7/30* (2017.01)
*G06T 7/11* (2017.01)

(52) U.S. Cl.
CPC .............. *G06T 2207/10081* (2013.01); *G06T 2207/10088* (2013.01); *G06T 2207/20081* (2013.01); *G06T 2207/30016* (2013.01)

(58) Field of Classification Search
USPC ................................................ 382/128–134
See application file for complete search history.

(56) References Cited

U.S. PATENT DOCUMENTS

| | | | |
|---|---|---|---|
| 2010/0080432 A1 | 4/2010 | Lilja et al. | |
| 2011/0286649 A1 | 11/2011 | Reisman et al. | |
| 2015/0038827 A1* | 2/2015 | Yamagata | A61B 6/481 600/411 |
| 2015/0293199 A1 | 10/2015 | Hu et al. | |
| 2017/0140551 A1 | 5/2017 | Bauer et al. | |
| 2017/0301085 A1* | 10/2017 | Riklin Raviv | G16H 40/63 |
| 2017/0372497 A1* | 12/2017 | Hu | G06T 5/007 |
| 2018/0249979 A1 | 9/2018 | Wang et al. | |
| 2019/0269359 A1* | 9/2019 | Kim | G06T 7/11 |
| 2020/0034948 A1* | 1/2020 | Park | A61N 5/1039 |
| 2020/0167608 A1* | 5/2020 | Madani | G16H 30/40 |
| 2020/0380687 A1* | 12/2020 | Avital | A61B 5/0042 |

FOREIGN PATENT DOCUMENTS

| | | |
|---|---|---|
| JP | 2017508561 | 3/2017 |
| JP | 2017520305 | 7/2017 |
| JP | 2018011958 | 1/2018 |
| JP | 2018505705 | 3/2018 |
| WO | 2018048507 | 3/2018 |

OTHER PUBLICATIONS

Ataer-Cansizoglu, Esra, et al. "Towards respiration management in radiation treatment of lung tumors: transferring regions of interest from planning CT to kilovoltage X-ray images." 2010 Annual International Conference of the IEEE Engineering in Medicine and Biology. IEEE, 2010. (Year: 2010).*
Office Action of Japan Counterpart Application, with English translation thereof, dated Feb. 1, 2022, pp. 1-5.

* cited by examiner 1 disease region extraction apparatus
2 imaging apparatus
2A CT apparatus
2B MRI apparatus
3 image storage server
4 network Bc1    CT image
Dm1   estiamted image
M1     first learning model A1   infarction region
Dm1  estimated image
M2   second learning model

DISEASE REGION EXTRACTION APPARATUS, DISEASE REGION EXTRACTION METHOD, AND DISEASE REGION EXTRACTION PROGRAM

CROSS-REFERENCE TO RELATED APPLICATIONS

The present application claims priority under 35 U.S.C. § 119 to Japanese Patent Application No. 2018-186788, filed on Oct. 1, 2018. Each of the above application is hereby expressly incorporated by reference, in its entirety, into the present application.

BACKGROUND OF THE INVENTION

1. Field of the Invention

The present disclosure relates to a disease region extraction apparatus, a disease region extraction method, and a non-transitory computer readable medium for storing a disease region extraction program.

2. Description of the Related Art

In recent years, advances in medical apparatuses, such as a computed tomography (CT) apparatus and a magnetic resonance imaging (MRI) apparatus, have made it possible to perform image diagnosis using high-resolution medical images with higher quality. In particular, in a case in which a target part is the brain, image diagnosis using, for example, CT images and MR images makes it possible to specify regions causing cerebrovascular disorders, such as cerebral infarction and cerebral hemorrhage. Therefore, various methods for supporting image diagnosis have been proposed.

For example, JP2013-165765A discloses a method which detects a cerebral infarction part included in an MRI diffusion-weighted image (DWI), acquires, from an abnormal part of the diffusion-weighted image and a diffusion-weighted image of a healthy person, position conversion data required for anatomical registration therebetween, converts a single photon emission computed tomography (SPECT) image captured by a SPECT apparatus on the basis of the position conversion data such that the position of each tissue of the brain of the patient is matched with the position of each tissue of the brain of the healthy person, and discriminates the cerebral infarction part on the SPECT image. In addition, JP2018-505705A discloses a method which inputs an MR image, applies conversion using machine learning to the input MR image to generate a CT image, and performs diagnosis using the images of a plurality of modalities including the generated CT image.

Thrombolytic therapy using a therapeutic agent, such as alteplase, is performed for cerebral infarction patients. However, it has been known that the thrombolytic therapy is applied within 4.5 hours from the time when no cerebral infarction has been confirmed and the risk of bleeding after treatment becomes higher as an infarction region becomes wider over time. Therefore, it is necessary to quickly and appropriately discriminate the infarction region using medical images in order to determine whether the thrombolytic therapy is appropriate.

SUMMARY OF THE INVENTION

In contrast, it has been known that, in a case in which the infarction region is already wide, the possibility of bleeding is high. However, it is difficult even for a medical specialist to accurately capture the infarction region on the CT image and it is desirable to automatically extract and quantify the infarction region using a computer. For this reason, deep learning which has attracted attention in recent years can be applied as a method for automatically extracting the infarction region. Learning information including a plurality of data sets of CT images and correct infarction regions in the CT images is required for deep learning. However, since the infarction region is not always clear on the CT image, it is difficult to prepare a large amount of data indicating the correct infarction region in the CT image.

The present disclosure has been made in view of the above-mentioned problems and an object of the present disclosure is to provide a technique that can extract an infarction region even in an image in which it is difficult to prepare a large amount of data indicating a correct infarction region.

According to the present disclosure, there is provided a disease region extraction apparatus comprising: an image acquisition unit that acquires a first image obtained by capturing an image of a subject that has developed a disease; an estimated image derivation unit that estimates a second image, whose type is different from a type of the first image, from the first image to derive an estimated image; and a disease region extraction unit that extracts a disease region from the estimated image derived by the estimated image derivation unit.

Here, in the present disclosure, for example, a CT image acquired by administering a contrast medium to the subject and a CT image acquired without administering the contrast medium to the subject are referred to as "different types of images" even though the images are the same CT images. That is, images captured and acquired under slightly different imaging conditions are referred to as "different types of images". In addition, images acquired by different imaging principles, such as a CT image, an MR image, and a positron emission tomography (PET) image, are referred to as "different types of images". Further, in the present disclosure, it is assumed that the first image and the second image are obtained by capturing the images of the same subject.

In the disease region extraction apparatus according to the present disclosure, the estimated image derivation unit may comprise a first discriminator that has been subjected to machine learning using learning information including a plurality of data sets of an image set obtained by registration between the first image and the second image whose type is different from the type of the first image, and the estimated image derivation unit may derive the estimated image of the second image output from the first discriminator on the basis of the first image input to the first discriminator.

In the disease region extraction apparatus according to the present disclosure, the disease region extraction unit may comprise a second discriminator that has been subjected to machine learning using learning information including at least one of a plurality of data sets of the second image whose type is different from the type of the first image and a disease region defined in the second image or a plurality of data sets of the estimated image of the second image derived by the estimated image derivation unit and a disease region defined in the estimated image, and the disease region extraction unit may extract the disease region output from the second discriminator on the basis of the estimated image input to the second discriminator.

In the disease region extraction apparatus according to the present disclosure, the first image and the second image may be captured under different imaging conditions.

Here, in the present disclosure, the "imaging conditions" mean various conditions during imaging which include whether or not a contrast medium is administered to the subject, X-ray irradiation conditions, and a slice width.

In the disease region extraction apparatus according to the present disclosure, the first image and the second image may be captured by different imaging principles.

Here, in the present disclosure, the "imaging principles" mean imaging methods, such as CT imaging, MR imaging, and PET imaging, in a case in which imaging is performed.

In the disease region extraction apparatus according to the present disclosure, the first image may be a CT image and the second image may be an MR image.

In the disease region extraction apparatus according to the present disclosure, the MR image may be a diffusion-weighted image.

In the disease region extraction apparatus according to the present disclosure, the subject may be a brain of a patient that has developed cerebral infarction, and the disease region may be an infarction region.

The disease region extraction apparatus according to the present disclosure may further comprise a display control unit that reflects the disease region extracted by the disease region extraction unit in the first image acquired by the image acquisition unit and displays the first image on a display unit.

According to the present disclosure, there is provided a disease region extraction method comprising: acquiring a first image obtained by capturing an image of a subject that has developed a disease; estimating a second image, whose type is different from a type of the first image, from the first image to derive an estimated image; and extracting a disease region from the derived estimated image.

In addition, a non-transitory computer readable medium for storing a program that causes a computer to perform the disease region extraction method according to the present disclosure may be provided.

Another disease region extraction apparatus according to the present disclosure comprises a memory that stores commands executed by a computer and a processor that is configured to execute the stored commands. The processor performs a process of acquiring a first image obtained by capturing an image of a subject that has developed a disease; a process of estimating a second image, whose type is different from a type of the first image, from the first image to derive an estimated image; and a process of extracting a disease region from the derived estimated image.

According to the disease region extraction apparatus, the disease region extraction method, and a non-transitory computer readable medium for storing the disease region extraction program of the present disclosure, it is possible to extract an infarction region even in an image in which it is difficult to prepare a large amount of data indicating a correct infarction region.

DESCRIPTION OF THE PREFERRED EMBODIMENTS

Figure 1:
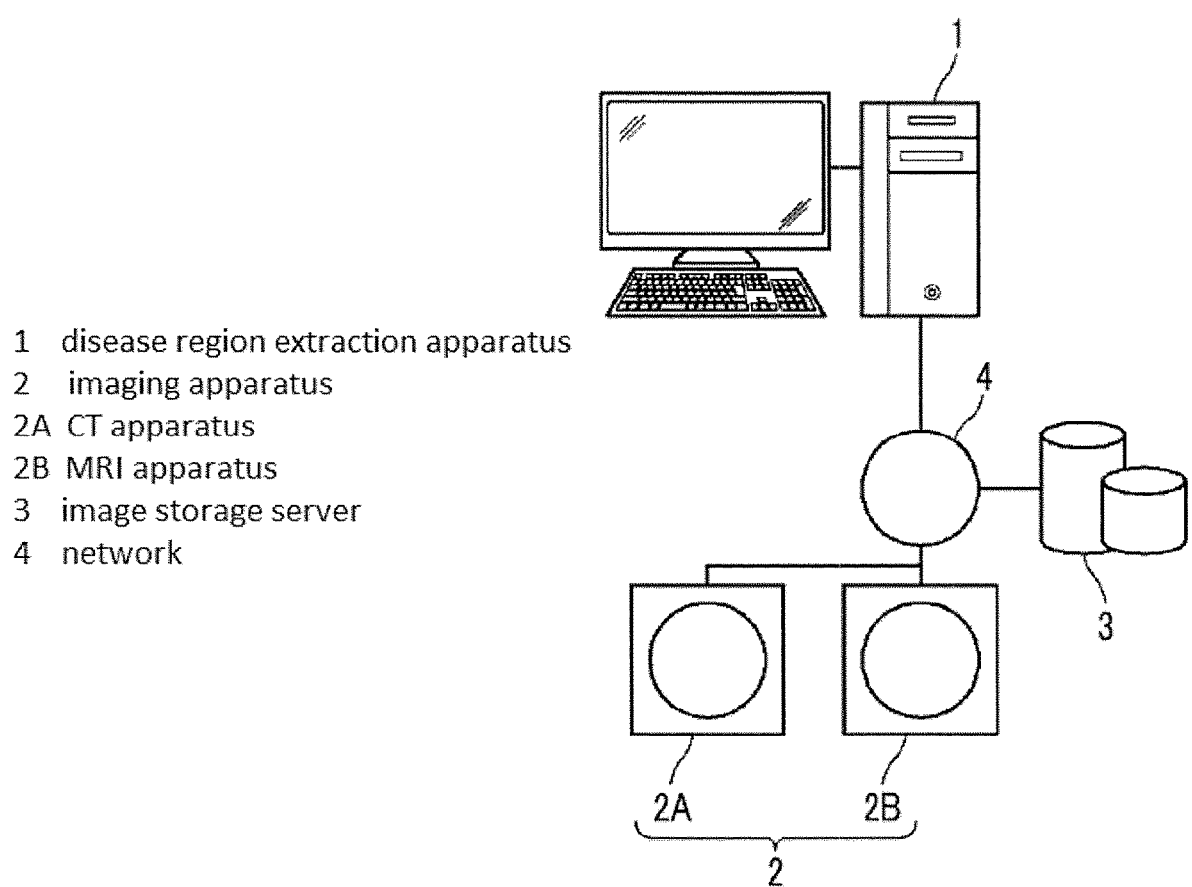
FIG. 1 is a hardware configuration diagram illustrating the outline of a diagnosis support system to which a disease region extraction apparatus according to an embodiment of the present disclosure is applied.

Hereinafter, an embodiment of the invention will be described with reference to the drawings. FIG. 1 is a hardware configuration diagram illustrating the outline of a diagnosis support system to which a disease region extraction apparatus according to an embodiment of the invention is applied. As illustrated in FIG. 1, in the diagnosis support system, a disease region extraction apparatus 1, a three-dimensional imaging apparatus 2, and an image storage server 3 according to this embodiment are connected so as to communicate with each other through a network 4. The image storage server 3 corresponds to a data storage unit according to the invention.

The three-dimensional imaging apparatus 2 captures an image of a part of a subject to be diagnosed and generates a three-dimensional image indicating the part. Specifically, the three-dimensional imaging apparatus 2 is, for example, a CT apparatus, an MRI apparatus, or a PET apparatus. A three-dimensional image including a plurality of slice images generated by the three-dimensional imaging apparatus 2 is transmitted to the image storage server 3 for each unit examination and is then stored in the image storage server 3. In this embodiment, a diagnosis target part of a patient that is the subject is the brain and the three-dimensional imaging apparatus 2 includes a CT apparatus 2A and an MRI apparatus 2B. The CT apparatus 2A generates a three-dimensional CT image Bc0 including the brain of the subject and the MM apparatus 2B generates a three-dimensional MR image Bm0 including the brain of the subject. In this embodiment, the MR image Bm0 is a diffusion-weighted image. In addition, in this embodiment, the CT image Bc0 is a non-contrast-enhanced CT image acquired by imaging without using a contrast medium. However, a contrast-enhanced CT image acquired by imaging using a contrast medium may be used.

The image storage server 3 is a computer that stores and manages various types of data and comprises a high-capacity external storage device and database management software. The image storage server 3 performs communication with other apparatuses through the wired or wireless network 4 to transmit and receive, for example, image data. Specifically, the image storage server 3 acquires various types of data including image data of the three-dimensional image generated by the three-dimensional imaging apparatus 2 through the network, stores the acquired data in a recording medium, such as a high-capacity external storage device, and manages the data. In addition, the storage format of the image data and the communication between the apparatuses through the network 4 are based on a protocol such as Digital Imaging and Communication in Medicine (DICOM).

The disease region extraction apparatus 1 is configured by installing a disease region extraction program according to the present disclosure in one computer. The computer may be a workstation or a personal computer that is directly operated by a doctor who performs diagnosis or may be a server computer that is connected to them through the network. The disease region extraction program is recorded on a recording medium, such as a digital versatile disc (DVD) or a compact disc read only memory (CD-ROM), and is then distributed. The disease region extraction program is installed in the computer from the recording medium. Alternatively, the disease region extraction program is stored in a storage device of a server computer connected to the network or a network storage so as to be accessed from the outside, is downloaded to the computer used by the doctor on request, and is then installed in the computer.

Figure 2:
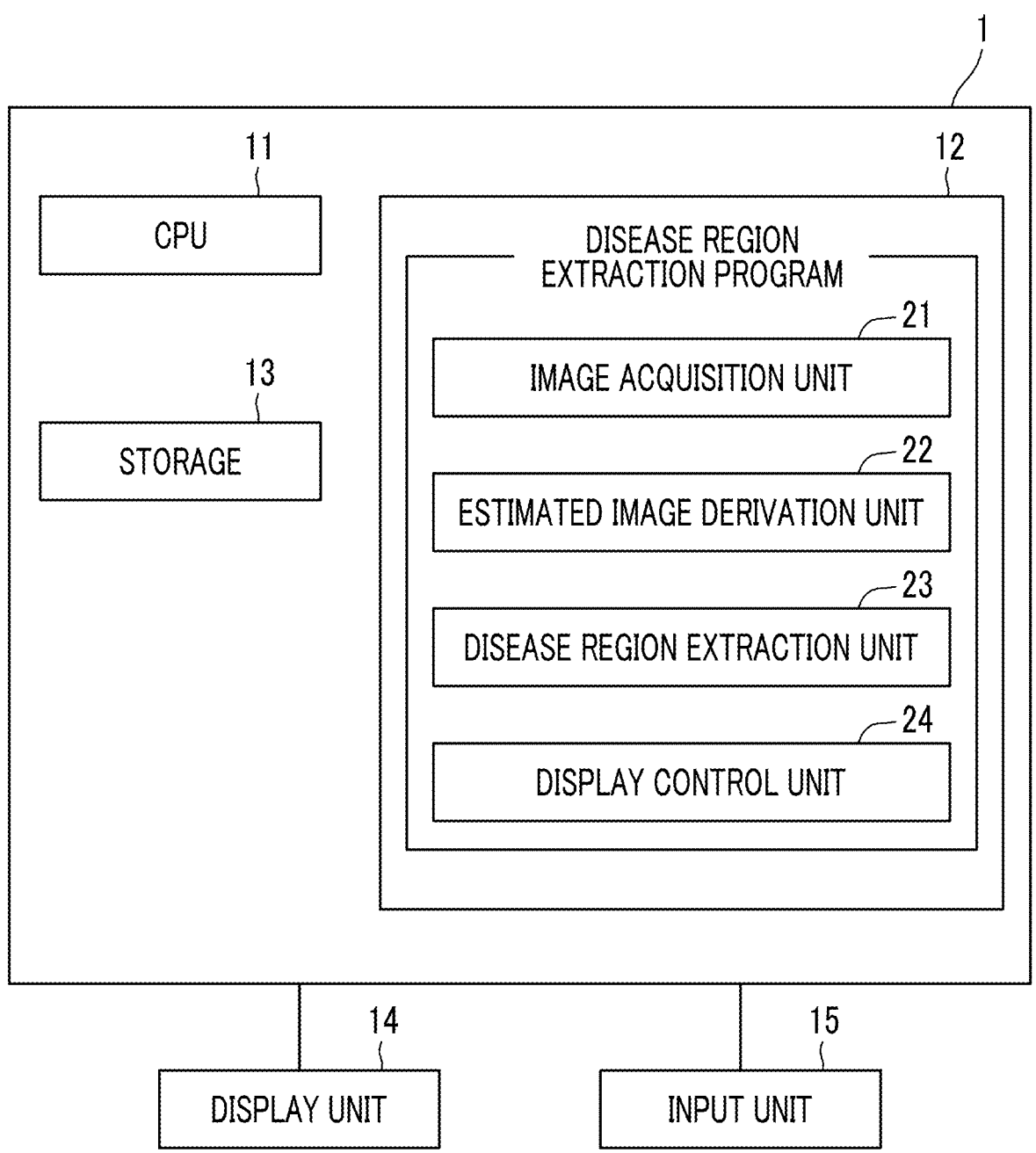
FIG. 2 is a block diagram schematically illustrating the configuration of the disease region extraction apparatus according to the embodiment of the present disclosure.

FIG. 2 is a diagram schematically illustrating the configuration of the disease region extraction apparatus according to the embodiment of the present disclosure which is implemented by installing the disease region extraction program in the computer. As illustrated in FIG. 2, the disease region extraction apparatus 1 has the configuration of a standard workstation and comprises a central processing unit (CPU) 11, a memory 12, and a storage 13. In addition, a display unit 14, such as a liquid crystal display, and an input unit 15 including, for example, a keyboard and a mouse are connected to the disease region extraction apparatus 1. The input unit 15 receives various setting inputs from the user. In addition, a touch panel may be used so as to function as both the display unit 14 and the input unit 15.

The storage 13 is, for example, a hard disk drive or a solid state drive (SSD). The storage 13 stores various kinds of information including the medical images of the subject and information required for processes which have been acquired from the image storage server 3 through the network 4.

The memory 12 stores the disease region extraction program. The disease region extraction program defines, as the processes performed by the CPU 11, the following processes: an image acquisition process that acquires a CT image Bc1 of the brain of the subject that has developed cerebral infarction; an estimated image derivation process that estimates an MR image of the brain from the CT image Bc1 of the brain to derive an MR estimated image Dm1 of the brain; a disease region extraction process that extracts an infarction region A1 from the derived MR estimated image Dm1 of the brain; and a display control process that reflects the extracted infarction region A1 in the CT image Bc1 of the brain and displays the CT image Bc1 on the display unit 14. In the present disclosure, the MR estimated image Dm1 corresponds to an estimated image.

Then, the CPU 11 performs these processes according to the program such that the computer functions as an image acquisition unit 21, an estimated image derivation unit 22, a disease region extraction unit 23, and a display control unit 24.

The image acquisition unit 21 acquires the CT image Bc0 and the MR image Bm0 of the brain of the subject that has developed cerebral infarction from the image storage server 3 in order to train a first discriminator 30 and a second discriminator 31 which will be described below. In addition, the image acquisition unit 21 acquires the CT image Bc1, from which the infarction region is to be extracted, from the image storage server 3 in order to extract the infarction region. In a case in which the CT image Bc0, the CT image Bc1, and the MR image Bm0 have been stored in the storage 13, the image acquisition unit 21 may acquire the CT image Bc0, the CT image Bc1, and the MR image Bm0 from the storage 13. Further, the image acquisition unit 21 acquires the CT images Bc0 and the MR images Bm0 of a large number of subjects in order to train the first discriminator 30 and the second discriminator 31 which will be described below.

Figure 3:
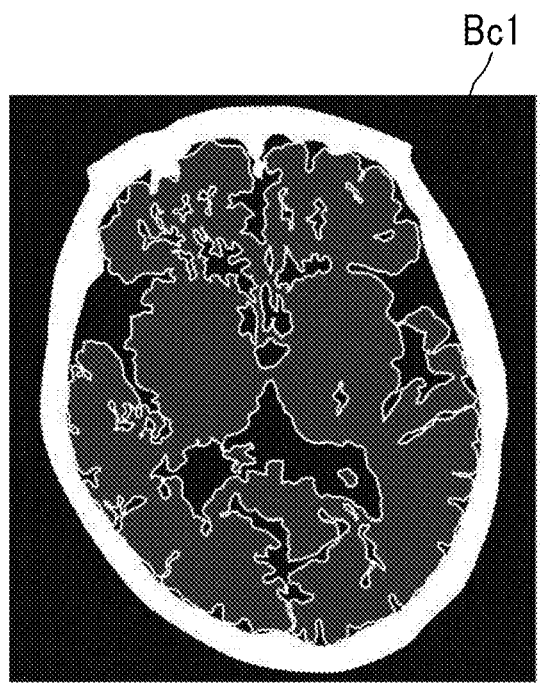
FIG. 3 is a diagram illustrating an example of a CT image from which an infarction region is to be extracted.
Figure 4:
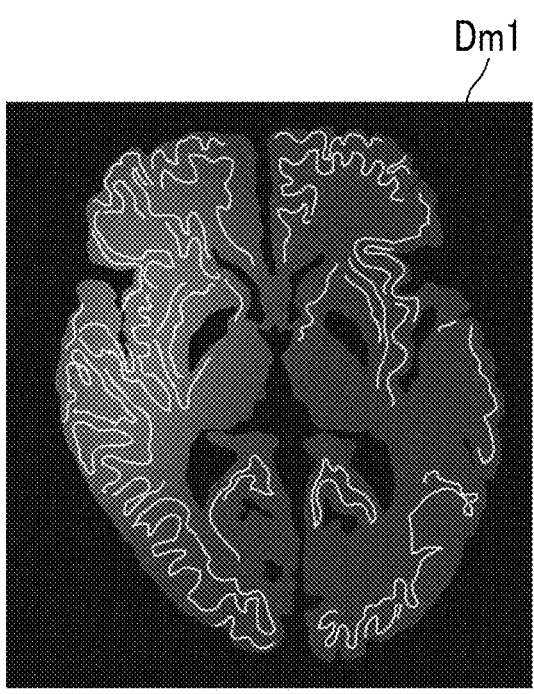
FIG. 4 is a diagram illustrating an example of an MR estimated image.

The estimated image derivation unit 22 derives, from the CT image Bc1 of the brain, the MR estimated image Dm1 of the brain obtained by estimating the MR image of the brain which is obtained by capturing an image of the subject that is an imaging target in the CT image Bc1 from which the infarction region is to be extracted. FIG. 3 is a diagram illustrating an example of the CT image Bc1 from which the infarction region is to be extracted and FIG. 4 is a diagram illustrating an example of the MR estimated image Dm1. The CT image Bc1 is a three-dimensional image. However, here, for ease of description, a two-dimensional tomographic image in one tomographic plane of the CT image Bc1 is used. The MR estimated image Dm1 is also a three-dimensional image. However, here, for ease of description, a two-dimensional tomographic image is used as in the CT image Bc1. The estimated image derivation unit 22 stores the derived MR estimated image Dm1 in the image storage server 3.

As illustrated in FIG. 3, since a difference in signal value between a cerebral infarction region and other regions is not so large in the CT image Bc1 of the brain, it is difficult to extract the infarction region using the CT image Bc1. In contrast, the MR image which is a diffusion-weighted image is an image that does not include the skull and includes only a soft tissue, such as brain parenchyma (see the MR image Bm0 on the right side in FIG. 7). In the MR image, the infarction region has a larger pixel value (higher signal value) than other regions and is displayed in white. Therefore, the estimated image derivation unit 22 derives the MR estimated image Dm1 illustrated in FIG. 4 obtained by estimating the MR image of the brain on the basis of the CT image Bc1 in order to extract the infarction region. As illustrated in FIG. 4, the MR estimated image Dm1 that is the estimated image of the MR image which is a diffusion-weighted image does not include the skull and includes only a soft tissue such as brain parenchyma.

Figure 5:
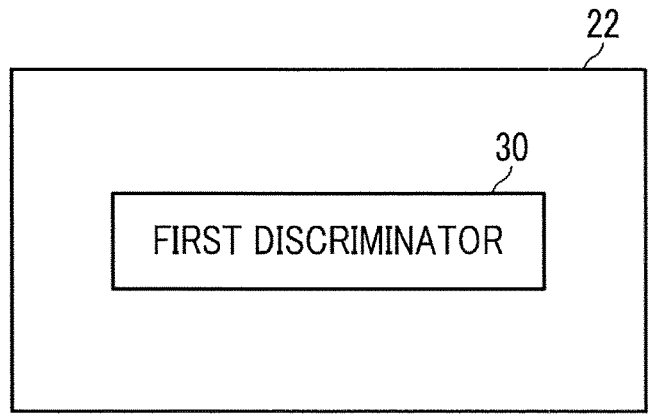
FIG. 5 is a diagram illustrating the configuration of an estimated image derivation unit according to the embodiment of the present disclosure.
Figure 6:
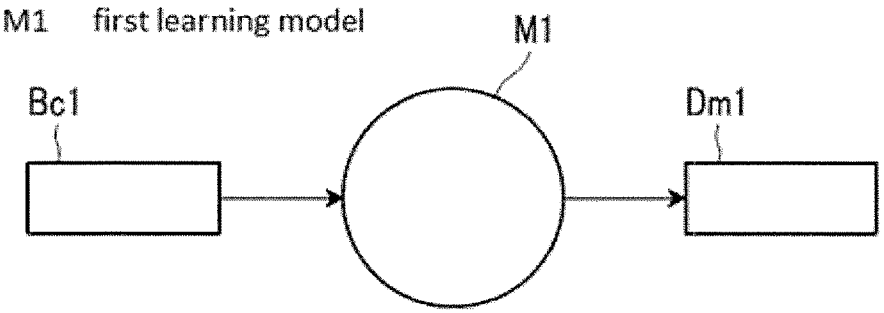
FIG. 6 is a diagram illustrating a learning model M1.

A known technique for creating an MR image on the basis of a CT image, such as a method using pixel value conversion and machine learning, can be used as a method for deriving the MR estimated image Dm1 from the CT image Bc1. In this embodiment, for example, a method using machine learning is used. FIG. 5 is a diagram illustrating the configuration of the estimated image derivation unit 22 according to the embodiment of the present disclosure and FIG. 6 is a diagram illustrating a learning model M1.

As illustrated in FIG. 5, the estimated image derivation unit 22 comprises the first discriminator 30. The first discriminator 30 includes the learning model M1. The learning model M1 outputs the MR estimated image Dm1 in a case in which the CT image Bc1 is input, as illustrated in FIG. 6. In this embodiment, for example, the estimated image derivation unit 22 also functions as a learning unit that trains the learning model M1 such that the MR estimated image Dm1 is output in a case in which the CT image Bc1 is input. The present disclosure is not limited thereto. For example, the disease region extraction apparatus 1 may comprise a new learning unit or a new learning unit may be provided separately from the disease region extraction apparatus 1.

Figure 7:
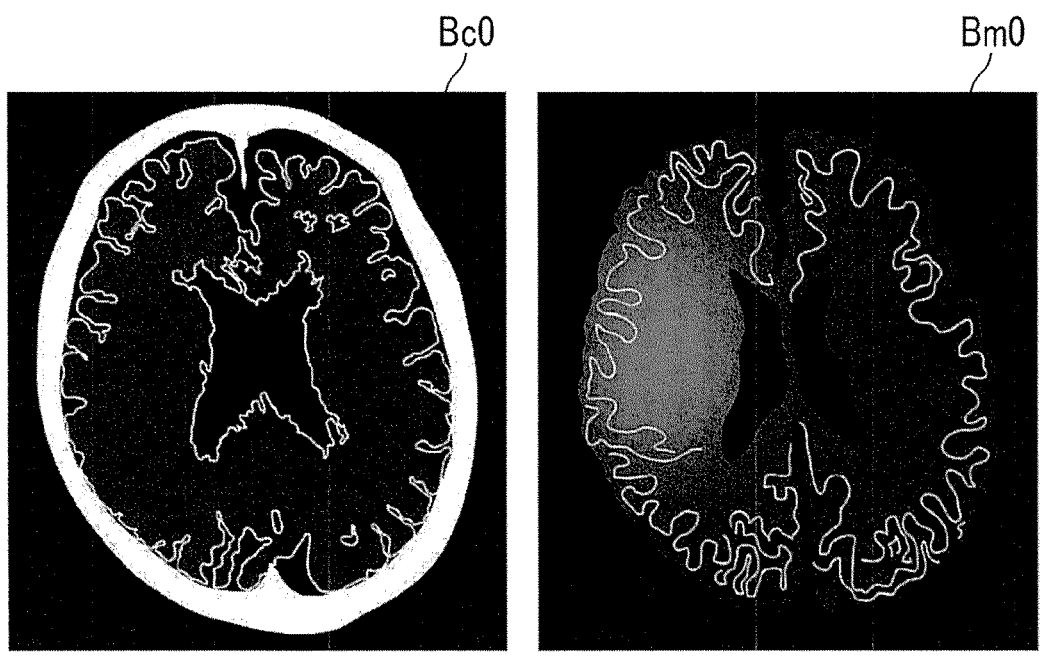
FIG. 7 is a diagram illustrating registration between the CT image and the MR image.

The estimated image derivation unit 22 performs the registration between the CT images Bc0 and the MR images Bm0 of a large number of subjects acquired by the image acquisition unit 21. FIG. 7 is a diagram illustrating the registration between the CT image and the MR image. Both the CT image Bc0 and the MR image Bm0 are three-dimensional images. However, here, the description will be made using a two-dimensional tomographic image in one corresponding tomographic plane of the CT image Bc0 and the MR image Bm0 for ease of understanding.

As illustrated in FIG. 7, the shape of the brain is almost the same in the same subject. In the MR image Bm0, an infarction region has a larger pixel value (higher signal value) than other regions. In contrast, in the CT image Bc0, the difference between the pixel values of the infarction region and other regions is not larger than that in the MR image Bm0. The CT image Bc0 includes the skull and the brain parenchyma unlike the MR image Bm0 which is a diffusion-weighted image. Therefore, the estimated image derivation unit 22 extracts a brain parenchyma region as a brain region from the CT image Bc0 and performs the registration between the extracted brain region and the MR image Bm0.

In this embodiment, the estimated image derivation unit 22 registers one of the CT image Bc0 and the MR image Bm0 with the other, using a rigid registration method. In this embodiment, the CT image Bc0 is registered with the MR image Bm0. However, the MR image Bm0 may be registered with the CT image Bc0. In addition, a non-rigid registration method may be used as the registration method. For example, a method which non-linearly converts a feature point in the CT image Bc0 into a correspondence point corresponding to a feature point in the MR image Bm0 using a function, such as a B-spline or a thin-plate spline, can be used as the non-rigid registration method. However, the present disclosure is not limited thereto.

The estimated image derivation unit 22 acquires learning information including a plurality of data sets of an image set of the CT image Bc0 and the MR image Bm0 registered as described above. The estimated image derivation unit 22 trains the learning model M1, using the learning information as training data, such that the MR estimated image Dm1 is output in a case in which the CT image Bc1 is input. The estimated image derivation unit 22 derives the MR estimated image Dm1 from the CT image Bc1, using the learning model M1 trained as described above.

Figure 8:
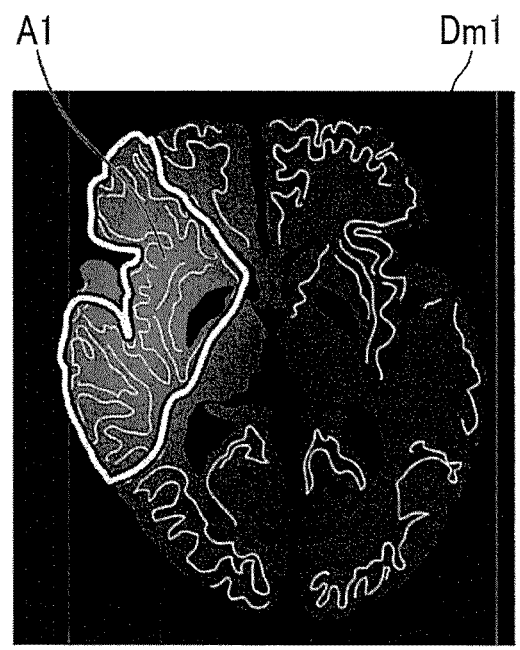
FIG. 8 is a diagram illustrating the extraction of the infarction region in the MR estimated image.

The disease region extraction unit 23 extracts an infarction region from the MR estimated image Dm1 of the brain derived by the estimated image derivation unit 22. FIG. 8 is a diagram illustrating the extraction of the infarction region A1 in the MR estimated image Dm1. The MR estimated image Dm1 is a three-dimensional image. However, the description will be made using a two-dimensional tomographic image for ease of understanding. As illustrated in FIG. 8, the MR estimated image Dm1 which is an estimated image of the MR image that is a diffusion-weighted image does not include the skull and includes only a soft tissue such as the brain parenchyma. As illustrated in FIG. 8, in the MR estimated image Dm1, similarly to the MR image Bm0 which is a diffusion-weighted image, the infarction region has a larger pixel value (higher signal value) than other regions and is displayed in white. For example, the disease region extraction unit 23 extracts a region having a pixel value greater than a predetermined threshold value as the infarction region in the MR estimated image Dm1. Then, the infarction region A1 illustrated in FIG. 8 is extracted.

Figure 9:
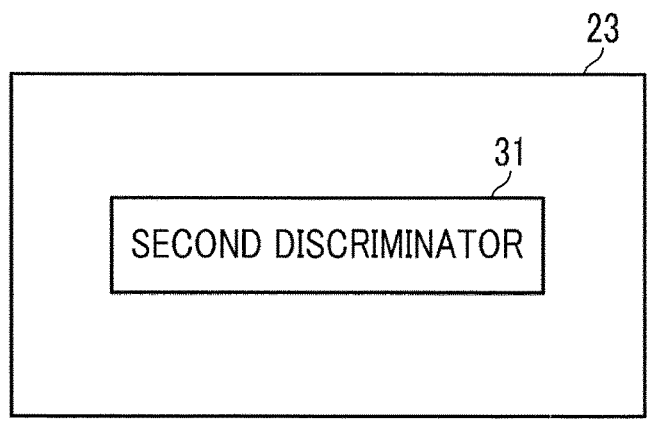
FIG. 9 is a diagram illustrating the configuration of a disease region extraction unit according to the embodiment of the present disclosure.
Figure 10:
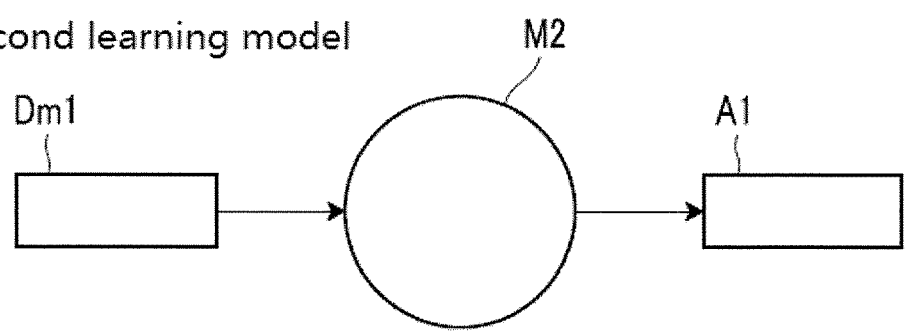
FIG. 10 is a diagram illustrating a learning model M2.

The technology according to the present disclosure is not limited thereto and a method using machine learning may be used. FIG. 9 is a diagram illustrating the configuration of the disease region extraction unit 23 according to the embodiment of the present disclosure and FIG. 10 is a diagram illustrating a learning model M2.

As illustrated in FIG. 9, the disease region extraction unit 23 comprises the second discriminator 31. The second discriminator 31 includes the learning model M2. The learning model M2 outputs the infarction region A1 in a case in which the MR estimated image Dm1 is input as illustrated in FIG. 10. In this embodiment, for example, the disease region extraction unit 23 also functions as a learning unit that trains the learning model M2 such that the infarction region A1 is output in a case in which the MR estimated image Dm1 is input. The present disclosure is not limited thereto. For example, the disease region extraction apparatus 1 may comprise a new learning unit or a new learning unit may be provided separately from the disease region extraction apparatus 1.

Figure 11:
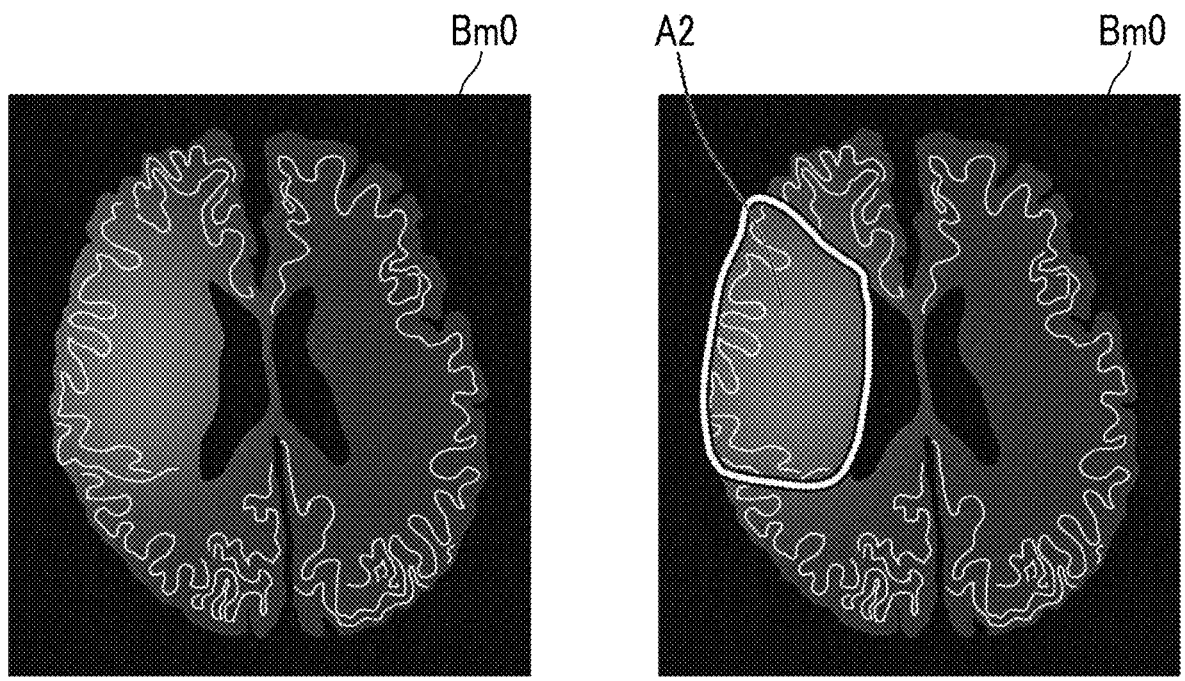
FIG. 11 is a diagram illustrating a data set of an MR image and a disease region.

FIG. 11 is a diagram illustrating a data set of the MR image Bm0 and an infarction region A2. The MR image Bm0 is a three-dimensional image. Here, the description will be made using a two-dimensional tomographic image in one corresponding tomographic plane of the MR image Bm0 for ease of understanding. In the MR image Bm0 which is a diffusion-weighted image, as illustrated in FIG. 11, the infarction region A2 has a larger pixel value (higher signal value) than other regions. Therefore, for example, the disease region extraction unit 23 extracts, as the infarction region A2, a region having a pixel value greater than a predetermined threshold value in the MR images Bm0 of a large number of subjects acquired by the image acquisition unit 21 and defines the infarction region A2 as the infarction region A2 of the MR image Bm0.

The disease region extraction unit 23 trains the learning model M2, using learning information including a plurality of data sets of the MR image Bm0 and the infarction region A2 defined as described above as training data, such that the infarction region A1 is output in a case in which the MR estimated image Dm1 is input. Specifically, the learning model M2 classifies the positions of the voxels of the CT image Bc1 which is an extraction target into two classes, that is, an infarction region and a region other than the infarction region, and discriminates the infarction region. Therefore, the disease region extraction unit 23 acquires a feature amount in a region with a predetermined size (for example, 3×3) from the infarction region A2 defined in the MR images Bm0 of a plurality of subjects, inputs the acquired feature amount to the learning model M2, and performs learning, that is, machine learning for the learning model M2 such that the discrimination result of the infarction region is output. The disease region extraction unit 23 extracts the infarction region A1 from the MR estimated image Dm1, using the learning model M2 trained as described above.

In the above-described embodiment, the learning information including a plurality of data sets of the MR image Bm0 and the infarction region A2 defined in the MR image Bm0 is used as the training data of the learning model M2. However, the technology according to the present disclosure is not limited thereto. For example, instead of the learning information or in addition to the learning information, learning information including a plurality of data sets of the MR estimated image Dm1 and the infarction region A1 defined in the MR estimated image Dm1 may be used as the training data of the learning model M2. In this case, the image acquisition unit 21 also acquires the MR estimated image Dm1 stored in the image storage server 3.

The disease region extraction unit 23 reflects the infarction region A1 extracted from the MR estimated image Dm1 in the CT image Bc1 to specify the infarction region A1 as the infarction region extracted from the CT image Bc1. That is, since the MR estimated image Dm1 is derived from the CT image Bc1 which is an extraction target, the positions of the MR estimated image Dm1 and the CT image Bc1 are aligned with each other without registration. Therefore, the infarction region A1 extracted from the MR estimated image Dm1 is reflected in the CT image Bc1 to specify the infarction region A1 as the infarction region extracted from the CT image Bc1.

For example, a support vector machine (SVM), a deep neural network (DNN), a convolutional neural network (CNN), and a recurrent neural network (RNN) can be used as the machine learning method.

Figure 12:
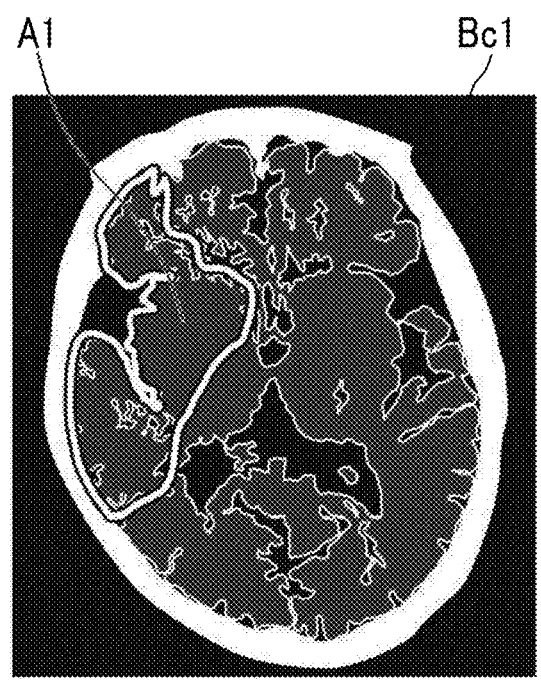
FIG. 12 is a diagram illustrating an example of the display of an extraction result.

The display control unit 24 reflects the extraction result of the disease region extraction unit 23 in the CT image Bc1 which is an extraction target and displays the CT image Bc1 on the display unit 14. FIG. 12 is a diagram illustrating an example of the display of the extraction result. FIG. 12 illustrates a tomographic image in one tomographic plane of the CT image Bc1 which is an extraction target. As illustrated in FIG. 12, in the extraction result displayed on the display unit 14, the infarction region A1 is displayed in the CT image Bc1 which is an extraction target.

For example, the display control unit 24 displays the infarction region A1 so as to be surrounded by a white frame as illustrated in FIG. 12. However, the present disclosure is not limited thereto.

The display aspect of the infarction region A1 may be appropriately changed. For example, the infarction region A1 may be displayed so as to be hatched or may be highlighted in black or white.

Figure 13:
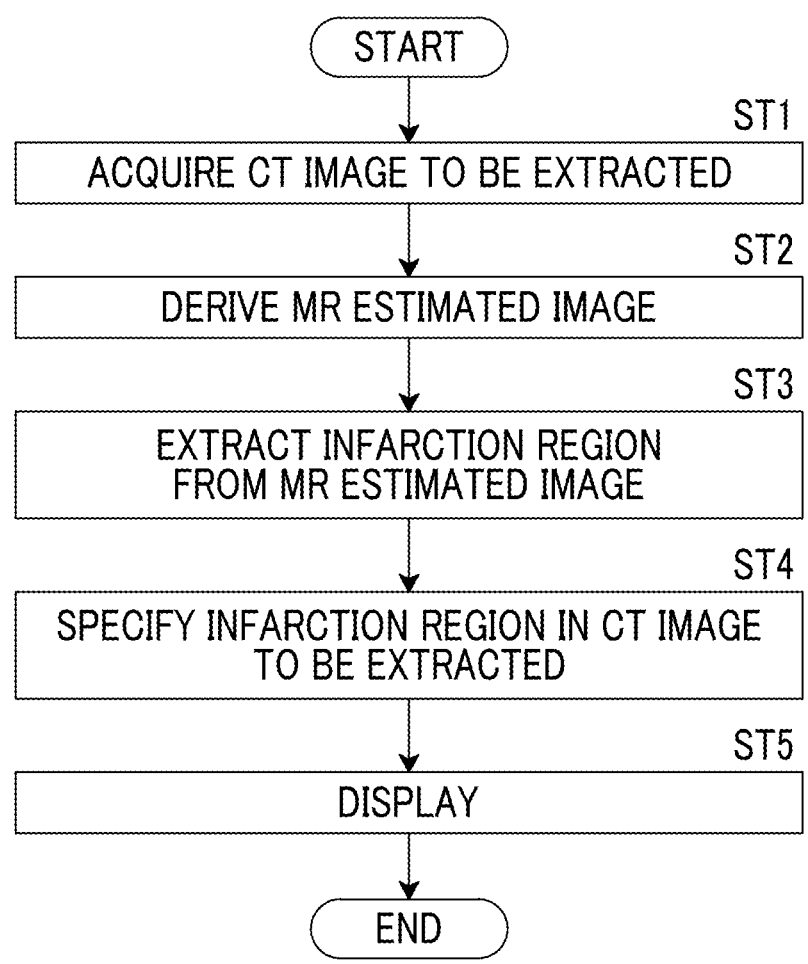
FIG. 13 is a flowchart illustrating a process performed in the embodiment of the present disclosure.

Next, a process performed in this embodiment will be described. FIG. 13 is a flowchart illustrating the process performed in the embodiment of the present disclosure. First, the image acquisition unit 21 acquires the CT image Bc1 from which an infarction region is to be extracted, that is, the CT image Bc0 of the brain of the subject that has developed cerebral infarction (Step ST1). The estimated image derivation unit 22 derives the MR estimated image Dm1 from the CT image Bc0 (Step ST2).

Then, the disease region extraction unit 23 extracts the infarction region A1 from the MR estimated image Dm1 (Step ST3) and specifies the infarction region A1 in the CT image Bc1 from which the infarction region is to be extracted (Step ST4). The display control unit 24 reflects the infarction region A1 in the CT image Bc1 and displays the CT image Bc1 on the display unit 14 (Step ST5). Then, the process ends.

As such, in this embodiment, the CT image Bc1 of the brain obtained by capturing an image of the subject that has developed cerebral infarction is acquired and the MR estimated image Dm1 of the brain obtained by estimating the MR image of the brain obtained by capturing an image of the same subject as described above is derived from the CT image Bc1 of the brain. Then, the infarction region A1 is extracted from the derived MR estimated image Dm1 of the brain. Therefore, the infarction region can be extracted by using only the CT image. As a result, it is possible to rapidly diagnose cerebral infarction using only the CT image.

Therefore, according to this embodiment, for example, it is possible to extract an infarction region even in an image such as a CT image in which it is difficult to prepare a large amount of data indicating a correct infarction region. That is, in this embodiment, the number of data sets of a MR image and an infarction region defined in the MR image (a correct infarction region) is larger than a number of data sets of a CT image and an infarction region defined in the CT image. By estimating a MR image which has more correct data sets than a CT image from a CT image, extraction of an infarction region can be accurate.

As such, in this embodiment, the diffusion-weighted image is used as the MR image Bm0. However, MR images other than the diffusion-weighted image Bm1 may be used. For example, a FLAIR image, a T1-weighted image, and a T2-weighted image may be used. Further, one or more images selected from, for example, the diffusion-weighted image, the FLAIR image, the T1-weighted image, and the T2-weighted image may be used.

In the above-described embodiment, the estimated image derivation unit 22 derives the MR estimated image Dm1 on the basis of the CT image Bc1. However, the present disclosure is not limited thereto. For example, the estimated image derivation unit 22 may derive a contrast-enhanced CT estimated image on the basis of a non-contrast-enhanced CT image. In this case, not the MR image but the contrast-enhanced CT image is used as the training data. In general, a thrombus region extracted from a CT image provides a clue to specify an acute infarction. In addition, the specification of the thrombus region is also required for endovascular treatment. However, it is difficult to see the blood vessels on the non-contrast-enhanced CT image since the blood vessels are not contrasted. Therefore, the thrombus region is not always clear and it is difficult to specify the position of the thrombus region. For this reason, the contrast-enhanced CT estimated image is estimated, using the contrast-enhanced CT image, in which the blood vessels are relatively easier to see than those in the non-contrast-enhanced CT image, as training data, and the thrombus region is extracted from the contrast-enhanced CT estimated image. Therefore, it is possible to extract the thrombus region using only the non-contrast-enhanced CT image. Therefore, it is possible to extract the thrombus region even in an image such as a contrast-enhanced CT image in which it is difficult to prepare a large amount of data indicating a correct thrombus region. In addition, for example, even in a case in which it is difficult to use a contrast medium for the subject, it is possible to diagnose cerebral thrombosis with high accuracy.

In the above-described embodiment, the non-contrast-enhanced CT image or the contrast-enhanced CT image is used as the CT image Bc0 used to train the learning model M1. However, both the contrast-enhanced CT image and the non-contrast-enhanced CT image may be used to train the learning model M1. The use of the trained learning model M1 makes it possible to discriminate an infarction region even in a case in which the CT image which is an extraction target is any of the contrast-enhanced CT image or the non-contrast-enhanced CT image.

In the above-described embodiment, for example, the following various processors can be used as the hardware structure of processing units performing various processes, such as the image acquisition unit 21, the estimated image derivation unit 22, the disease region extraction unit 23, and the display control unit 24. The various processors include a CPU which is a general-purpose processor executing software (program) to function as various processing units as described above, a programmable logic device (PLD), such as a field programmable gate array (FPGA), which is a processor whose circuit configuration can be changed after manufacture, and a dedicated electric circuit, such as an application specific integrated circuit (ASIC), which is a processor having a dedicated circuit configuration designed to perform a specific process.

One processing unit may be configured by one of the various processors or a combination of two or more processors of the same type or different types (for example, a combination of a plurality of FPGAs and a combination of a CPU and an FPGA). In addition, a plurality of processing units may be configured by one processor.

A first example of the configuration in which a plurality of processing units are configured by one processor is an aspect in which one processor is configured by a combination of one or more CPUs and software and functions as a plurality of processing units. A representative example of this aspect is a client computer or a server computer. A second example of the configuration is an aspect in which a processor that implements the functions of the entire system including a plurality of processing units using one integrated circuit (IC) chip is used. A representative example of this aspect is a system-on-chip (SoC). As such, various processing units are configured by using one or more of the various processors as a hardware structure.

In addition, specifically, an electric circuit (circuitry) obtained by combining circuit elements, such as semiconductor elements, can be used as the hardware structure of the various processors.

EXPLANATION OF REFERENCES

1: disease region extraction apparatus
2: three-dimensional imaging apparatus
3: image storage server
4: network
11: CPU
12: memory
13: storage
14: display unit
15: input unit
21: image acquisition unit
22: estimated image derivation unit
23: disease region extraction unit
24: display control unit
30: first discriminator
31: second discriminator
A1, A2: infarction region
Bc0: CT image
Bc1: CT image to be discriminated
Bm0: MR image
Dm1: estimated image
M1: first learning model
M2: second learning model

What is claimed is:

1. A disease region extraction apparatus comprising:
a processor configured to:
acquire a first image, which is obtained without using a contrast medium, by capturing an image of a subject that has developed a disease;
estimate a second image from the first image, in which the second image is an estimated image derived from the first image, the second image has a type different from a type of the first image; and
extract a disease region from the second image wherein the second image is the estimated image derived from the first image,
wherein a difference in signal value between the disease region and other regions is larger in the second image than in the first image, and
the processor reflects the disease region extracted from the second image onto the first image,
wherein the processor comprises a first discriminator that has been subjected to machine learning using learning information including an image set which includes a third image and a fourth image, wherein the third image is the same type as the first image, and the fourth image is a different type from the first image, wherein the third image and the fourth image are registered with each other, and
the processor derives the estimated image of the second image output from the first discriminator on the basis of the first image input to the first discriminator.

2. The disease region extraction apparatus according to claim 1, wherein the processor comprises a second discriminator that has been subjected to machine learning using learning information including at least one of a plurality of data sets of a fifth image whose type is different from the type of the first image and a disease region defined in the fifth image or a plurality of data sets of the second image and a disease region defined in the estimated image, and
the processor extracts the disease region output from the second discriminator on the basis of the estimated image input to the second discriminator.

3. The disease region extraction apparatus according to claim 1,
wherein the processor comprises a second discriminator that has been subjected to machine learning using learning information including at least one of a plurality of data sets of a fifth image whose type is the same as the fourth image and a disease region defined in the fifth image or a plurality of data sets of the second image and a disease region defined in the estimated image, and
the processor extracts the disease region output from the second discriminator on the basis of the estimated image input to the second discriminator.

4. The disease region extraction apparatus according to claim 1,
wherein the third image and the fourth image are captured under different imaging conditions.

5. The disease region extraction apparatus according to claim 1,
wherein the third image and the fourth image are captured by different imaging principles.

6. The disease region extraction apparatus according to claim 1,
wherein the first image is a CT image and the second image is an MR image.

7. The disease region extraction apparatus according to claim 6,
wherein the MR image is a diffusion-weighted image.

8. The disease region extraction apparatus according to claim 1,
wherein the subject is a brain of a patient that has developed cerebral infarction, and
the disease region is an infarction region.

9. The disease region extraction apparatus according to claim 2,
wherein the subject is a brain of a patient that has developed cerebral infarction, and
the disease region is an infarction region.

10. The disease region extraction apparatus according to claim 3,
   wherein the subject is a brain of a patient that has developed cerebral infarction, and
   the disease region is an infarction region.

11. The disease region extraction apparatus according to claim 4,
   wherein the subject is a brain of a patient that has developed cerebral infarction, and
   the disease region is an infarction region.

12. The disease region extraction apparatus according to claim 1,
   wherein the processor is further configured to reflect the extracted disease region in the acquired first image and display the first image on a display.

13. A disease region extraction method comprising:
   acquiring a first image, which is obtained without using a contrast medium, by capturing an image of a subject that has developed a disease;
   estimating a second image from the first image, in which the second image is an estimated image derived from the first image, the second image has a type different from a type of the first image; and
   extracting a disease region from the second image wherein the second image is the estimated image derived from the first image,
   wherein a difference in signal value between the disease region and other regions is larger in the second image than in the first image, and
   reflecting the disease region extracted from the second image onto the first image,
   wherein a processor comprises a first discriminator that has been subjected to machine learning using learning information including an image set which includes a third image and a fourth image, wherein the third image is the same type as the first image, and the fourth image is a different type from the first image, wherein the third image and the fourth image are registered with each other, and
   the processor derives the estimated image of the second image output from the first discriminator on the basis of the first image input to the first discriminator.

14. A non-transitory computer readable medium for storing a disease region extraction program that causes a computer to perform:
   a process of acquiring a first image, which is obtained without using a contrast medium, by capturing an image of a subject that has developed a disease;
   a process of estimating a second image from the first image, in which the second image is an estimated image derived from the first image, the second image has a type different from a type of the first image; and
   a process of extracting a disease region from the second image wherein the second image is the estimated image derived from the first image,
   wherein a difference in signal value between the disease region and other regions is larger in the second image than in the first image, and
   a process of reflecting the disease region extracted from the second image onto the first image,
   wherein a processor comprises a first discriminator that has been subjected to machine learning using learning information including an image set which includes a third image and a fourth image, wherein the third image is the same type as the first image, and the fourth image is a different type from the first image, wherein the third image and the fourth image are registered with each other, and
   the processor derives the estimated image of the second image output from the first discriminator on the basis of the first image input to the first discriminator.

* * * * *